3,645,911
METHOD FOR ENCAPSULATING AQUEOUS OR HYDROPHILIC MATERIAL
Jan Frans van Besauw, Brasschaat, and Daniel Alois Claeys, Mortsel, Belgium, assignors to Gevaert-Agfa N.V., Mortsel, Belgium
No Drawing. Filed Nov. 20, 1969, Ser. No. 878,545
Claims priority, application Great Britain, Nov. 20, 1968, 55,080/68; Dec. 31, 1968, 2,229/68
Int. Cl. A61k 9/04; B01j 13/02; G03c 1/10
U.S. Cl. 252—316       7 Claims

ABSTRACT OF THE DISCLOSURE

In the encapsulation of water-soluble substances according to U.S. Pat. 3,523,906, a variation in the concentration of such substance in the aqueous core solution is avoided by incorporating in the aqueous continuous phase containing a hydrophilic colloid, the same water-soluble substance to be encapsulated in a concentration at least as great as its concentration in the aqueous core solution.

---

The invention relates to a process for forming microcapsules comprising an aqueous material in a solid mantle of a water-insoluble material.

According to the process described in the U.S. Ser. application No. 724,217, now U.S. Pat. 3,523,906, issued Aug. 11, 1970, microcapsules comprising water or other aqueous material or (a) hydrophilic substance(s) in a solid mantle of a polymeric material are formed by:

(A) emulsifying or dispersing the aqueous material or a hydrophilic substance or substances in a solution of a polymeric material, the solvent for said polymeric material being water-immiscible and having a boiling point lower than 100° C.;
(B) emulsifying the emulsion or dispersion obtained in an aqueous solution of a hydrophilic colloid; and
(C) removing the solvent for the polymeric material from the system so formed by evaporation.

In the specification hereinafter the aqueous phase used for filling the capsules is called "the first aqueous phase" and the aqueous phase in which the droplets of the first aqueous phase surrounded by the organic polymer solution are dispersed is called "the second aqueous phase."

It has been found experimentally that when the first aqueous phase surrounded by the organic polymer solution is emulsified in the aqueous solution of hydrophilic colloid, a transfer of substances dissolved in the first aqueous phase to the second aqueous phase takes place. This makes it impossible to encapsulate aqueous solutions of a given concentration.

It has been found now that aqueous solution can be encapsulated without removal or without substantial removal of (a) dissolved substance(s) from the capsule fill solution during the encapsulation process.

It has been found indeed that the transfer of (a) dissolved substances(s) from the first aqueous phase into the second one can be prevented by dissolving in the latter phase said substance(s) in substantially the same or higher concentration as in the first aqueous phase.

If the compositions of the first and second aqueous phases are the same, the emulsifying steps designated (A) and (B) in the above definition of the process according to the U.S. Ser. application No. 724,217, now U.S. Pat. No. 3,523,906 can be performed in immediate or very close succession so as to prevent or avoid any tendency of the capsule droplets formed in step (A) to coagulate. The different operations can be performed in the same mixing vessel.

The method of the present invention is limited in that way that the substances dissolved in the second aqueous phase should not precipitate the dissolved hydrophilic colloid present in said phase. It is a function of the dissolved hydrophilic colloid in the second aqueous phase to act as a protective colloid and dispersing agent for the polymer-surrounded aqueous droplets.

Since it is very difficult to obtain capsule shells that are completely impermeable to water, particularly when pressure-rupturable capsules have to be produced with a very thin wall, it is necessary to enclose in the aqueous capsule fill a water-retaining or hygroscopic substance that does not migrate through the capsule wall.

Hygroscopic substances causing water to remain encased are, e.g. glycerol, and other polyols having a water-attracting character, and mineral water-attracting substances such as hygroscopic salts, e.g., magnesium chloride.

When applying the present invention it is possible to encapsulate said hygroscopic substances in a well determined proportion in respect of the water. Moreover, very high concentrated aqueous solutions can be encapsulated and consequently hygroscopic substance(s) can be enveloped in any amount retarding drying out of the capsules under normal and low relative humidity conditions.

The second phase has not to be considered as wasted after a first encapsulation. Indeed, both phases may be of substantially the same composition although the second aqueous phase may comprise a higher concentration of the ingredient or ingredients to be encapsulated with water than the first one. As a result, after removal of organic liquid and of capsules, and if necessary after dilution the second aqueous phase can be re-used in a following encapsulation batch if the substance(s) to be encapsulated do not cause flocculation of the hydrophilic colloid.

After the concept of the present invention has been stated in general, there will now be given particulars concerning its application and the ingredients applied therein.

The capsule shells enveloping the aqueous composition, which includes aqueous solutions as well as aqueous dispersions, are preferably made of (a) water-insoluble substance(s) that is (are) soluble in a water-immiscible solvent or mixture of such solvents and that has (have) or obtain(s) by evaporating the solvent(s) and/or by hardening or cross-linking a sufficient cohesion power to be capable of forming a coherent envelope (film) around the aqueous liquid fill.

In the process according to the invention, practically all preformed, film-forming, hydrophobic polymers inasmuch as they are resistant to water and soluble in a water-immiscible solvent having a boiling point lower than 100° C., are suited for forming the capsule wall.

Film-forming substances suited for preparing the capsule wall according to the present invention are of the class of hydrophobic addition polymers formed by polymerisation or copolymerisation of vinyl polymers such as styrene, vinyl chloride, vinylidene chloride, vinyl esters, vinyl ethers, acrylic acid esters and methacrylic acid esters, acrylonitrile and methacrylonitrile.

Further are mentioned hydrophobic polymers that are soluble in a water-immiscible organic solvent and have been prepared by a polycondensation reaction, such as polyamides and polyester-amides, polycarbonates, e.g. a polycarbonate of 2,2-bis(4-hydroxyphenyl)-propane, polycarboxylic acid esters of polyols or polyphenols, polysulphonates and polyphosphonates. Still further are mentioned hydrophobic polymers that are soluble in a water-immiscible organic solvent and are prepared by a polyaddition reaction e.g. polyurethanes and hydrophobized hydrophilic polymers and modified hydrophobic polymers, e.g. hydrophobic cellulose derivatives, particularly ethyl-cellulose and hydrophobic chlorinated elastomers, e.g. chlorinated rubber.

Information about solvents that are immiscible with water and have a boiling point below 100° C. can be found in the book of C. Marsden: Solvents Manual with Solubility Chart, Elsevier Press Inc., New York (1954). Miscibility or immiscibility data of the most common solvents with water can be found in the tables on pp. 1394 to 1401 of D'Ansumd Lax, Taschenbuch für Chemiker und Physiker, Springer Verlag, Berlin (1949).

Suitable water-immiscible solvents are aliphatic and aromatic water-repellent solvents e.g. hydrocarbons such as n-hexane, benzene, halogenated hydrocarbons, e.g. methylene chloride and carbon tetrachloride, and water-immiscible ethers, e.g. diethyl ether.

The hydrophilic colloid used as dispersing agent in the second aqueous phase is preferably for at least 1% by weight soluble in water at room temperature. Suitable hydrophilic colloids are hydrophilic natural colloids, modified hydrophilic natural colloids, or synthetic hydrophilic colloids. In that respect are particularly mentioned: hydrophilic colloids such as gelatin, glue, casein, zein, hydroxyethylcellulose, carboxymethylcellulose, methylcellulose, carboxymethylhydroxyethyl-cellulose, gum arabic, sodium alginate, polyvinyl alcohol, poly-N-vinylpyrrolidone, polyvinylamine, polyethylene oxide, polystyrene sulphonic acid, polyacrylic acid, polymethacrylic acid and hydrophilic copolymers and derivatives of such polymers. From these colloids gelatin is preferably used. Especially good results are obtained moreover with polyvinyl alcohol and polystyrene sulphonic acid.

The encapsulation technique of the present invention including the step of removing the water-immiscible solvent by the evaporation is applicable for the encapsulation of aqueous compositions that contain organic water-soluble compounds preferably non-ionic organic water-soluble compounds as well as for the encapsulation of inorganic water-soluble compounds.

The liquid to be encapsulated has not necessarily to contain only dissolved substances; it may also contain dispersed particles or substances, e.g. suspended water-attracting compounds such as colloidal silica and other colloidal particles and pigments.

The aqueous compositions that can be encapsulated may comprise among others: wetting agents, hygroscopic compounds, fluorescing compounds, compounds decreasing or increasing the pH (pH controlling compound), fertilizers, phytopharmaceuticals, plant growth hormones, vitamines, pharmaceuticals, dyes, all types of chemical compounds, e.g. reducing agents, oxidizing agents, hardening agents, cross-linking agents, colour reactants or catalysts, which have to be kept apart from (a) reactant(s) or co-reactant(s) till the moment of dissolution, degradation, melting or rupture of the capsule shells.

When exposing the capsule to normal atmospheric circumstances, the encapsulated water will remain encased only for a limited period of time because of the relatively high water-permeability of the polymeric capsule wall. However, the substances dissolved or emulsified in the water will remain encased. Substances causing water to remain encased may be added either to the aqueous phase or to the polymer solution.

The capsules prepared according to the present invention can be applied in a recording system wherein capsules are ruptured by an image-wise applied pressure.

The capsules can also be applied in light-sensitive recording systems and materials. E.g. ingredients suitable for use in photographic processing can be encapsulated and set free at the proper moment in photographic processing by melting or rupturing the capsule shells. So, it is possible to incorporate a very active hardening agent in encapsulated form into a gelatin-containing layer of a silver halide photographic material, and to set it free at the proper moment, e.g. by capsule rupture.

Further in connection with photographic materials capsules can be used for preparing so-called packet emulsions containing light-sensitive silver halide. Moreover, capsules may be used that contain one or more photographic ingredients e.g. hydroquinone and other known silver halide developing agents, fixing agents, e.g. compounds yielding thiosulphate ions, image-stabilizing agents, e.g. compounds yielding isothiocyanate ions, development-activating or development-retarding substances, e.g. compounds increasing the pH, colour couplers, dyes, physical developing agents such as compositions comprising a water-soluble noble metal salt, e.g. silver nitrate and/or (a) reducing agent(s), in admixture with e.g. hydroquinone and 1-phenyl-3-pyrazolidinone, further diazo compounds and/or couplers for use in diazotype recording. In electrophotography capsules may be used as toner particles of the type that contain a liquid fill.

In thermographic materials capsules can be used having a meltable capsule shell and containing (a) reactant(s) e.g. a colour coupler, which is set free from the capsules upon melting of their shell.

In pressure-sensitive materials capsules may be used that can be ruptured by pressure and that contain (a) reactant(s), e.g. a colour coupler for (a) co-reactant(s) present in the recording sheet itself or in a receiving material wherein they can be transferred, e.g. by diffusion or evaporation.

Colour reactants and compositions suitable to be used in a thermographic process and pressure-recording process are mentioned in the following table. In this table couples of reactants (A) and (B) are listed yielding a visible colour change when contacting each other.

| A | B |
|---|---|
| 1. Compounds splitting off sulphur such as dithiooxamide, thioacetamide and p-phenylenedithiourea. | Inorganic and organic salts or soaps of iron, copper, silver, mercury, lead, nickel, cobalt and cadmium, such as copper stearate, silver nitrate, silver stearate, silver behenate, silver palmitate, mercury stearate, lead acetate, lead stearate, lead myristate, nickel acetate, nickel stearate, cobalt stearate, cadmium stearate and lead benzyl mercaptide. |
| 2. Acids such as oxalic acid, and malonic acid. | Compounds that are sensitive to changes in the pH-value, e.g., leucomalachite green, leucomethyl green, leucofuchsine and leucolissamine green. |
| 3. Oxidizing agents such as benzoyl peroxide, and tetrachloroquinone. | All compounds changing colour on oxidation, e.g. p-chloroaniline, methyl-p-aminophenol sulphate, N,N'-dimethyl-p-phenylenediamine, antipyrine, pyrogallol, pyrocatechol and 4-methoxy-1-naphthol. |
| 4. Couplers for diazotype such as 2,3-dihydroxynaphthalene, phloroglucinol and resorcinol. | Aromatic diazo compounds, e.g. the 4-(N,N-diethylamino)-benzene diazonium double salt with zinc chloride, p-nitrobenzene diazonium fluoroborate, and p-diethylamino-benzene-diazonium tetrafluoroborate. |
| 5. 1-phenyl-3-pyrazolidinone and derivatives such as 1-phenyl-4-methyl-3-pyrazolidinone, and 1-(p-tolyl)-5-phenyl-3-pyrazolidinone. | Silver salts such as silver nitrate and silver behenate, gold salts such as gold chloride and gold stearate, triazolium compounds such as 2,3-diphenylnaphtho-[1,2]-triazolium chloride and 2-phenyl-3-(o-carboxyphenyl)-naphtho-[1,2]-triazolium chloride, tetrazolium compounds such as 2,5-diphenyl-3-(o-carboxyphenyl)-2,1,3,4-tetrazolium chloride and 2,5-diphenyl-3-(p-methoxyphenyl)-2,1,3,4-tetrazolium chloride, leucophthalocyanines such as Phthalogene Blue IB (Farbenfabriken Bayer AG, Leverkusen, W. Germany). |
| 6. 8-hydroxy-1,2,3,4-tetrahydroquinoline and derivatives. | Inorganic and organic salts or soaps of iron, copper, silver, gold, cobalt and cadmium such as iron (III) chloride, iron (III) stearate, iron (II) chloride, iron (II) sulphate, iron(II) stearate, copper(II) chloride, copper(II) stearate, silver nitrate, silver behenate, and cobalt(II) chloride. Oxidising agents such as potassium dichromate and ammonium molybdate. |

TABLE—Continued

| A | B |
|---|---|
| 7. Phenols and naphthols, e.g. pyrocatechol, tert.-butyl-pyrocatechol, pyrogallol, tert.-butyl-pyrogallol, 4-amino-1-naphthol 4-methoxy-1-naphthol, resorcinol, 2,3-dihydroxynaphthalene and 1,4-dihydroxynaphthalene. | Inorganic and organic salts or soaps of iron, copper, silver, gold, mercury, nickel, cobalt, cadmium, cerium and tin, e.g. iron(III) stearate, iron(III) chloride, iron(II) chloride, iron(II) sulphate, iron(II) stearate, copper(II) sulphate, copper(II) chloride, copper(II) stearate, silver nitrate, silver stearate, silver behenate, gold(III) chloride, gold stearate, mercuro stearate, nickel stearate, cerium(IV) stearate and tin(II) chloride. Oxidising agents such as potassium dichromate, ammonium molybdate, ammonium vanadate, and quinone derivatives such as tetrachloroquinone. |
| 8. Amide compounds such as N,N-dimethylbenzamide and N-methylacetamide. | Nitroso compounds such as p-nitrosodimethylaniline and N-nitrosodiphenylamine. 5-bromo-2-amino-thiazoles, e.g. 2-ethylamino-4-phenyl-5-bromothiazole and 2-diphenyl-amino-4-phenyl-5-bromothiazole. |
| 9. Amines such as p-phenylenediamine, p-phenylenediamine and diethanolamine. | Aromatic aldehydes and ketones, e.g. tetrachloroquinone, 1,4-naphthoquinone, 2-chloro-naphthoquinone, 5-chlorovanillin, p-dimethylamino-benzaldehyde and 2,4-dinitro-benzaldehyde. |
| 10. Nitroderivatives, e.g. N-nitrosodiphenylamine, p-nitrosodimethylaniline and 1-nitroso-2-naphthol. | Aromatic hydroxy compounds, e.g. pyrogallol, gallic acid, methyl-p-aminophenol sulphate, and 4-methoxy-1-naphthol. Metal salts, e.g. iron(II) sulphate and cobalt acetate. Amines, e.g. 2,5-diaminotoluene and benzylaniline. |
| 11. Triazene compounds such as 1,3-diphenyl-triazene: 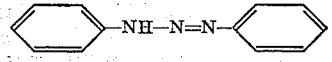 | Coupling agents for diazotype printing, e.g. 3-hydroxy-2-naphthanilide and 3-hydroxy-N-2-naphthyl-2-naphthamide. |
| 12. Aromatic amines and aromatic amino-hydroxy compounds, e.g. 1-amino-2-naphthol, 8-hydroxy-quinoline, p-phenylenediamine, and m-phenylenediamine. | Sulphur-containing compounds, e.g. sodium sulphide, sodium trithionate, thioacetamide and thiourea. Silver salts, e.g. silver nitrate, silver behenate, silver stearate, gold salts, e.g. gold(III) chloride and gold stearate. Mercury salts, e.g. mercury behenate. Cadmium salts, e.g. cadmium chloride. Oxidising compound, e.g. iron(III) stearate, copper copper(II) chloride, copper(II) stearate, cerium(IV) sulphate, ammonium vanadate, sodium bromate, potassium dichromate, ammonium molybdate and tetrachloroquinone. Nitroso compounds, e.g. o-nitrosobenzoic acid sodium salt, p-nitrosodimethylaniline, N-nitroso-dimethylamine and N-nitroso-diphenylamine. Aromatic diazonium compounds, e.g. p-diethylaminobenzene diazonium-trichloro zincate, and 2-hydroxy-4-sulpho naphthalene diazonium slat. |
| 13. Nitro compounds, e.g. 2-nitro-4-chloroaniline, 1-chloro-2-nitro-4-diethyl sulphamoyl-benzene and dintroresorcinol. | Metal salts, e.g. iron(III) chloride, iron(II) sulphate and cobalt acetate. Oxidisable compounds such as 4-amino-diphenylamine-2-sulphonic acid. |
| 14. Compounds that, on heating, set free alkali, e.g. those described in United Kingdom patent specification 983,363 and alkaline compounds, e.g. diethanolamine, tetramethylguanidine, p-phenylenediamine, and triethylamine. | Compounds that change in colour when the pH changes, e.g. the leucoform of p-nitrophenol, phenol-phthaleine, bromothymol blue chlorophenol red, bromo cresol purple, oxonol dyes and 1,2,3,4-tetrahydro-4-[2-(3-methyl-2-benzothiazolinylidene)ethylidene]-xanthyliumtetrachloroferrate(III). Mixtures of a diazonium salt and a coupler, e.g. the combination of p-diethylaminobenzene diazonium-tetrafluoroborate and phloroglucinol. |

In the preparation of the capsules it is sometimes necessary to use antifrothing agents, e.g. octyl alcohol, during the step of evaporating the organic solvent or mixture of organic solvents. The organic water-immiscible solvent is preferably of such type that it can be easily removed by evaporation under normal pressure conditions, in other words it has preferably a boiling point below 100° C. The evaporation under vacuum conditions, however, is not excluded and is particularly interesting in those cases wherein heat-sensitive substances have to be encapsulated and wherein the evaporation temperature has to be kept below the melting point or reaction temperature of substances forming the capsule shell or contained in the capsule fill.

The present invention includes the following examples. The percentages are by weight if not otherwise indicated.

EXAMPLE 1

In a first step 3 q. of potassium hexacyanoferrate(III) (an oxidizing agent) were dissolved in a mixture of 10 ml. of water, 5 ml. of glycerol and 1 ml. of 10% aqueous solution of gelatin. The obtained mixture was emulsified into 100 ml. of a 15% solution of polystyrene in methylene chloride.

In a second step 375 ml. of a 1% aqueous solution of gelatin were mixed in a 1 l. flask with 125 ml. of glycerol, whereupon the mixture was heated on a waterbath till 30° C.

While vigorously being stirred the emulsion prepared in step 1 was added to the mixture prepared in step 2 and the temperature of the whole composition gradually raised till 50–55° C.

In order to prevent foaming of the composition during the evaporation of the methylene chloride, 1 ml. of cetyl alcohol was added as antifoaming agent. Upon complete removal of the methylene chloride the composition left was cooled till room temperature (20° C.). The capsules were sucked off and on the filter plate washed three times with 100 ml. of 10% aqueous glycerol solution and once with 100 ml. of plain water.

The capsules could be ruptured by pressure and were used in a pressure-sensitive self-generating image-forming paper sheet containing leuco crystal violet, which is oxidized to the corresponding triphenyl methane dye by oxidation with the potassium hexacyanoferrate(III) liberated from the capsules.

EXAMPLE 2

A solution of 5 g. of N-(2-hydroxyethyl) - 2,3,3 - trimethyl-indolinium bromide (diazotype coupler) in 17 ml. of water and 2 ml. of a 10% aqueous solution of gelatin was mixed with 8 ml. of ethylene glycol. This solution was then emulsified into a mixture of 14 ml. of a 15% solution of polystyrene in methylene chloride and 17 ml. of diethyl ether. The mixer used was a high speed mixer, more particularly an Ultra Turrax Type 45 stirrer (Ultra Turrax is a trade name).

In a second step, 170 ml. of a 1% solution of gelatin in water was mixed with 80 ml. of ethylene glycol and heated on a water bath till 30° C.

While stirring with the same Ultra Turrax mixer as used in step 1, the emulsion was slowly poured into the mixture prepared in step 2. For antifoaming purposes 3 ml. of a 10% solution of Bayer E (Bayer E is an antifoaming agent on the basis of silicones sold by Farbenfabriken Bayer AG, Leverkusen, Germany) were added. When droplets of about 5–10µ were obtained (after 2–5 minutes of stirring) the Ultra Turrax mixer was replaced by an ordinary laboratory stirrer.

The temperature of the water bath was raised till 44° C., and when nearly all of the solvent mixture was evaporated, the encapsulation was completed at 50–55° C.

After cooling to 30° C., the capsules were isolated by centrifugation at 2000 r.p.m. They were washed with tap water and separated by centrifuging again. Drying of the wet capsules proceeded by spreading them out on water-absorbing porous plates.

The obtained capsules were rupturable by pressure or meltable. On setting free their content by pressure or melting a chemical reaction with a light-sensitive diazonium compound such as the diazonium compound obtained by diazotation of p-amino-N,N-dimethylaniline suited for the copulation with the N-(2-hydroxyethyl)-2,3,3-trimethylindolinium bromide was produced.

EXAMPLE 3

In a first step a solution of 2 g. of hydroquinone in 34 ml. of water was mixed with 4 ml. of a 10% aqueous solution of gelatin and 16 ml. of glycerol added thereto. This solution was then emulsified into a mixture of 28 ml. of a 20% solution of polystyrene in methylene chloride and 34 ml. of diethyl ether. The same high speed stirrer as in Example 2 was used.

In a second step, 20 g. of hydroquinone was dissolved at 40° C. in a mixture of 340 ml. of a 1% solution of gelatin in water and 160 ml. of glycerol.

The emulsion obtained in the first step was added to the solution obtained in the second step and the encapsulation effected as described in Example 2.

Microcapsules with a diameter of 5–10μ were obtained. The concentration of hydroquinone in the capsules was the same as that applied in the first step.

EXAMPLE 4

To 200 ml. of 10% aqueous solution of lead acetate, 50 ml. of 10% aqueous gelatin solution and 250 ml. of glycerol were added. Half of the thus obtained mixture was added in about 5 minutes to 200 ml. of a 10% solution of polystyrene in chloroform, placed in a 2 l. beaker in a water bath at 30° C. During addition, the mixture was stirred with an Ultra-Turrax mixer Type 45 at fairly low speed. Ultra-Turrax is a trade name of Janke & Kunkel, Staufen, Germany. After the addition, stirring was continued some 3 or 5 minutes till droplets sizing about 5 microns were obtained. Thereupon the rest of this mixture was added.

The Ultra-Turrax mixer was replaced by an ordinary laboratory propeller stirrer. The temperature of the water bath was gradually raised till 75–80° C. When all the chloroform was removed, the suspension of capsules was cooled till 35–40° C. The capsules were filtered with suction and once washed thoroughly with 300 ml. of 50% aqueous glycerol solution. The filtrate could be re-used in another encapsulation.

The capsules [1] sizing from 6 to 25 microns, were dispersed in acetonitrile, containing 1% by weight of oleic acid and 10% by weight of a phenolformaldehyde resin of the novolac type as binder. Then the mixture was coated onto a paper base containing dithiooxamide in the paper mass.

In that way a pressure-sensitive recording material was obtained.

Capsules with meltable capsule walls were obtained by substituting in the above composition the solution of polystyrene in chloroform by a 10% by weight solution of copoly(vinyltoluene - isobutyl - methacrylate) (mol ratio 50/50).

We claim:

1. A process of encapsulating an aqueous solution having dissolved therein in a predetermined concentration at least one water-soluble substance in a solid mantle of a polymeric material, which comprises:

(A) dispersing said aqueous solution in a solution of a film-forming hydrophobic polymeric material in a water-immiscible solvent having a boiling point lower than about 100° C.,
(B) emulsifying the dispersion thus obtained in an aqueous continuous phase containing a hydrophilic colloid and said water-soluble substance, the concentration in said continuous phase of said water-soluble substance being at least as great as its concentration in said first-mentioned aqueous phase, and
(C) evaporating said water-immiscible solvent from the system, said polymer being selected from the group consisting of a polymer and copolymer of at least one monomer selected from the group consisting of styrene, vinyl chloride, vinylidene chloride, vinyl esters, vinyl ethers, acrylic acid esters and methacrylic acid esters, acrylonitrile and methacrylonitrile, a polycondensation polymer of the group consisting of a polyamide, a polyesteramide, a polycarbonate, a polycarboxylic acid ester of a polyol and a polyphenol, a polysulphonate and a polyphosphonate, and a polyaddition polymer selected from the group consisting of a polyurethane, a hydrophobized hydrophilic polymer, a hydrophobized cellulose derivative and a chlorinated elastomer.

2. A process according to claim 1, wherein the hydrophilic colloid is a hydrophilic colloid that is soluble in water for at least 1% by weight.

3. A process according to claim 2, wherein the hydrophilic colloid is a colloid selected from the groups consisting of a hydrophilic natural colloid, a modified hydrophilic natural colloid, and a synthetic hydrophilic colloid.

4. A process according to claim 3, wherein the hydrophilic colloid is gelatin.

5. A process according to claim 1, wherein the aqueous solution to be encapsulated contains a hygroscopic compound.

6. A process according to claim 5, wherein the said hygroscopic compound is a water-attracting polyol.

7. A process according to claim 1, wherein the aqueous liquid to be encapsulated contains a non-ionic water-soluble compound.

References Cited

UNITED STATES PATENTS

| | | | |
|---|---|---|---|
| 3,043,782 | 7/1962 | Jensen | 252—316 |
| 3,306,747 | 2/1967 | Haas | 252—316 X |
| 3,523,906 | 8/1970 | Vrancken et al. | 252—316 |

OTHER REFERENCES

Larian, Fundamentals of Chemical Engineering Operations, Englewood Cliffs, N.J., Prentice-Hall, Inc., 1958, p. 167.

RICHARD D. LOVERING, Primary Examiner

U.S. Cl. X.R.

8—79; 96—91 R, 97; 117—36.8, 36.9, 100 B; 252—62.1 182, 186, 188, 301.2 R; 264—4; 424—32, 33, 35